(No Model.)  
2 Sheets—Sheet 1.

B. J. DETRICK.
CORN CUTTER AND SHOCKER.

No. 542,874. Patented July 16, 1895.

ATTEST  
Helen Graham  
William S. Graham.

INVENTOR.  
B. J. DETRICK.  
by his attorney  
L. P. Graham (No Model.) 2 Sheets—Sheet 2.
B. J. DETRICK.
CORN CUTTER AND SHOCKER.

No. 542,874. Patented July 16, 1895.

ATTEST
Helen Graham
William S. Graham

INVENTOR
B. J. DETRICK.
By his attorney
L. R. Graham

UNITED STATES PATENT OFFICE.

BENJAMIN J. DETRICK, OF SPRINGFIELD, ILLINOIS, ASSIGNOR OF ONE-HALF TO MARTIN HEINEKE, OF SAME PLACE.

CORN CUTTER AND SHOCKER.

SPECIFICATION forming part of Letters Patent No. 542,874, dated July 16, 1895.

Application filed March 14, 1895. Serial No. 541,667. (No model.)

*To all whom it may concern:*

Be it known that I, BENJAMIN J. DETRICK, of Springfield, in the county of Sangamon and State of Illinois, have invented certain new and useful Improvements in Corn Cutters and Shockers, of which the following is a specification.

This invention is designed to provide improved means for cutting and shocking corn. It relates more particularly to the operation of shocking. It is exemplified in the structure hereinafter described, and it is defined in the appended claims.

Figure 1:
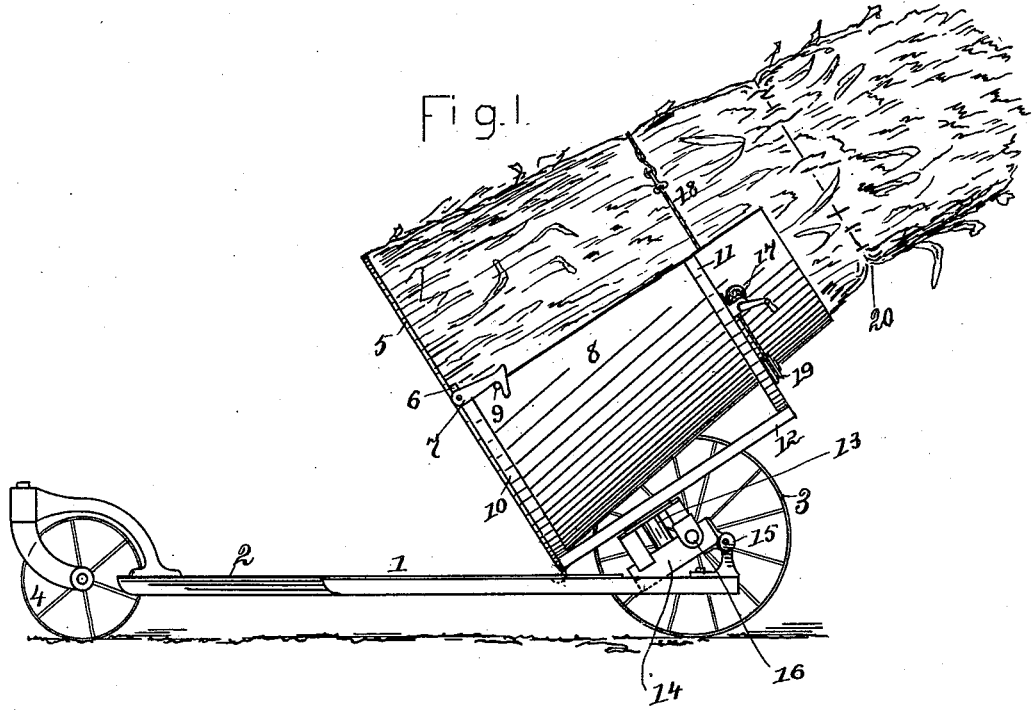
Figure 2:
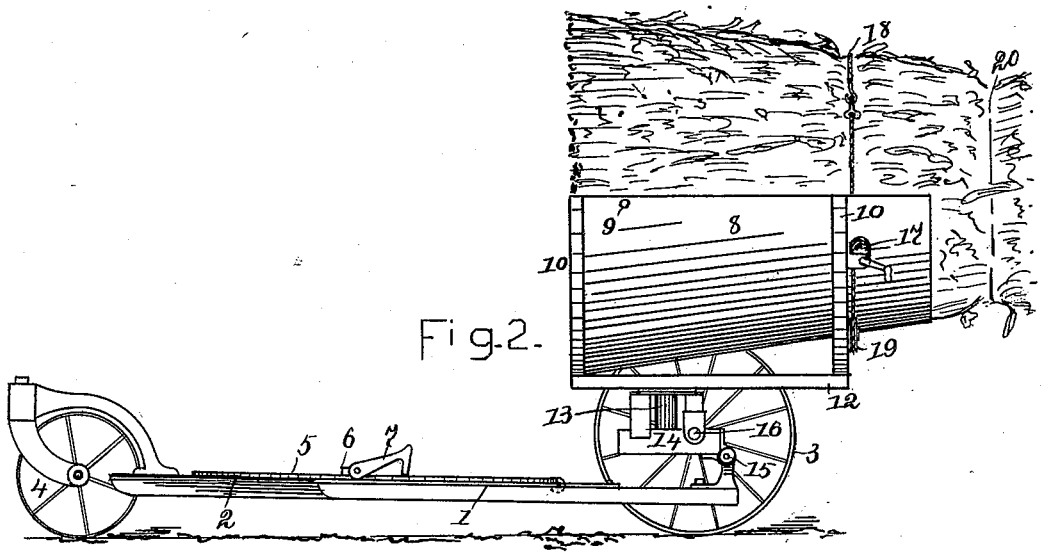
Figure 4:
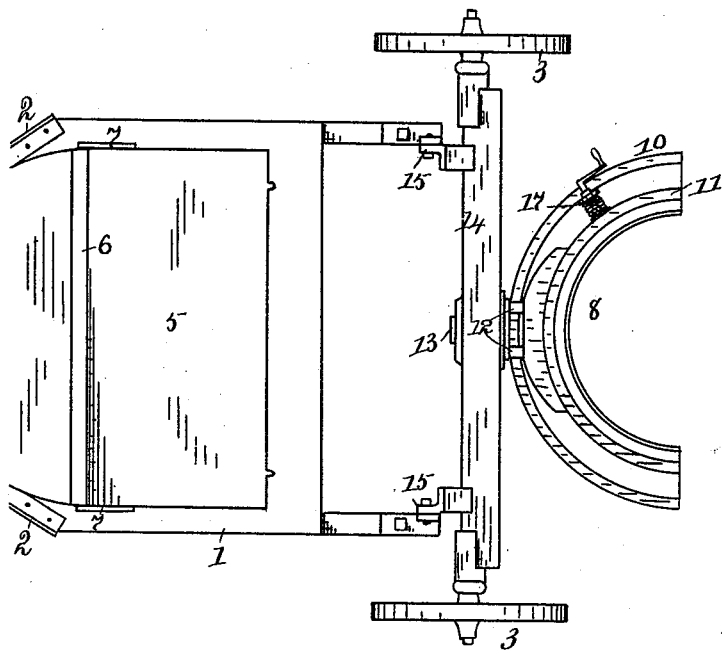
Figure 3:
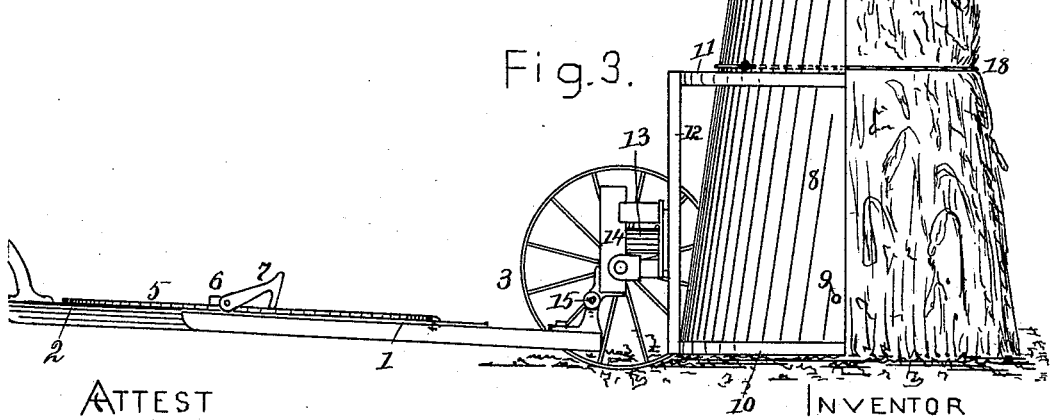

In the drawings forming part of this specification, Figure 1 is a side elevation showing the device in position to cut and receive the corn, and it represents a shock of corn collected and bound therein. Fig. 2 is a similar view showing the shock raised to a horizontal position preparatory to turning end for end. Fig. 3 is an elevation showing the shock turned around and dumped onto the ground, but not released from the shock-former. Fig. 4 is a plan of the rear part of the device in dumping position. In Figs. 1, 2, and 3 the near rear wheel is omitted to avoid obscuring the tilting axle-frame.

A platform on which the operators stand to receive the corn is shown at 1, and it is provided at its front end with cutters, as 2, or of any suitable construction. The rear end of the device is carried by two wheels 3 and by one or more front caster-wheels, as 4. A plate 5 is hinged at its rear end to platform 1, and is supplied with a cross-cleat 6 and side hooks 7. The shock-former 8 is a concave tapered receptacle provided with pins 9 for the hooks of the plate and strengthened by the ribs 10 and 11. Bars 12 support the ribs and have a pivot-pin 13, that journals in the axle-frame 14. The axle-frame may be made as shown in the drawings or in any suitable manner, as it is only essential that it shall provide a pivot-bearing for the shock-former, shall carry spindles 16 for wheels 3, and shall be pivotally connected with the platform or with extensions thereof in rear of the spindles when the shock-former is in position to receive the corn. The hinge connection of the platform with the axle-frame is shown at 15, and its eccentricity with relation to the spindle enables the weight of the operators to be utilized in raising the shock-former and the shock. The shock-former is provided with a drum 17, having a ratchet-wheel and pawl and a crank-handle, and an end of rope 18 runs around pulley 19 and is secured to the drum.

Preparatory to using the device the shock-former is tilted on the wheel-spindles to the position shown in Fig. 1, the plate 5 is swung up with its cleat above the top edge of the butt-end of the former, and the hooks 7 are made to engage the pins 9, one on each side of the former. The cleat of the plate then holds the shock-former from tilting, while the hooks hold the plate against the bottom of the former, and the device is ready for operation. As the horse or horses draw the device forward in the customary manner, the corn is cut by the cutters and deposited by the operators into the shock-former with the butts of the stalks lined up against the plate in a manner to form an even surface for the shock to stand on. When enough corn has been accumulated to form a shock the team is stopped, the rope 18 is connected around the stalks, as indicated, and is tightened by the drum until the shock assumes proper proportions. The band 20 is then secured around the upper end of the shock, the shock is raised somewhat, as shown in Fig. 2, for instance, is turned end for end and dumped onto the ground, and finally the rope is released from the shock, the parts of the device are readjusted, and the described operation is re-enacted as often as is desired.

In raising the shock from the position shown in Fig. 1 to that shown in Fig. 2 the operators stand on the platform and their weight draws down on the rear side of the axle-frame and assists in raising the shock. When the shock is dumped the empty former may be pulled upward by the operators while on the platform, and in this case the weight of the operators acts downward in front of the spindles and aids in raising the former.

Having thus described my invention, I claim as new and desire to secure by Letters Patent—

1. In a corn cutter and shocker, the combination of a platform, a shock-former horizontally swingable and vertically tiltable with relation to the platform, and a plate hinged to the platform and adapted to fit against the bottom end of the shock-former, substantially as set forth.

2. In a corn cutter and shocker, the combination of a platform, a shock-former horizontally swingable and vertically tiltable with relation to the platform, a plate hinged to the platform and adapted to fit against the bottom end of the former, a cleat on the plate adapted to fit over the upper edge of the bottom end of the former, and fastenings connecting the plate and the shock-former detachably together, substantially as set forth.

3. In a corn cutter and shocker, the combination of an axle-frame carrying a horizontally swingable shock-former, carrying-wheels on spindles of the axle frame, and a platform swung under the axle-frame and hinged thereto, substantially as set forth.

4. In a corn cutter and shocker, the combination of an axle-frame carrying a horizontally swingable shock-former, carrying-wheels on spindles of the axle frame, and a platform swung under the axle-frame and hinged thereto at points in the rear of the wheel spindles when the shock-former is in corn-receiving position, substantially as set forth.

In testimony whereof I sign my name in the presence of two subscribing witnesses.

BENJAMIN J. DETRICK.

Attest:
ALBERT SALZENSTEIN,
JNO. L. KING.